US008561015B2

(12) United States Patent
Rowan et al.

(10) Patent No.: US 8,561,015 B2
(45) Date of Patent: Oct. 15, 2013

(54) SOURCE CODE SEMANTIC ZOOM AND SPATIAL LAYOUT

(75) Inventors: Kael R Rowan, Redmond, WA (US); Robert A DeLine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 918 days.

(21) Appl. No.: 12/484,827

(22) Filed: Jun. 15, 2009

(65) Prior Publication Data

US 2010/0318959 A1   Dec. 16, 2010

(51) Int. Cl.
*G06F 9/44* (2006.01)
(52) U.S. Cl.
USPC ............................ 717/105; 717/109; 717/113
(58) Field of Classification Search
None
See application file for complete search history.

(56) References Cited

U.S. PATENT DOCUMENTS

| | | | |
|---|---|---|---|
| 5,581,797 A | 12/1996 | Baker et al. | |
| 5,838,973 A * | 11/1998 | Carpenter-Smith et al. | 717/105 |
| 5,959,623 A | 9/1999 | van Hoff et al. | |
| 6,493,868 B1 * | 12/2002 | DaSilva et al. | 717/105 |
| 6,792,595 B1 * | 9/2004 | Storistenau et al. | 717/110 |
| 6,928,615 B1 | 8/2005 | Haitsuka et al. | |
| 7,007,074 B2 | 2/2006 | Radwin | |
| 7,042,455 B2 | 5/2006 | Arcas | |
| 7,075,535 B2 | 7/2006 | Aguera y Arcas | |
| 7,133,054 B2 | 11/2006 | Aguera y Arcas | |
| 7,174,536 B1 | 2/2007 | Kothari et al. | |
| 7,464,366 B2 * | 12/2008 | Shukla et al. | 717/100 |
| 2003/0204481 A1 * | 10/2003 | Lau | 707/1 |
| 2003/0226141 A1 | 12/2003 | Krasnow et al. | |
| 2004/0088678 A1 | 5/2004 | Litoiu et al. | |
| 2004/0107414 A1 | 6/2004 | Bronicki et al. | |
| 2005/0065970 A1 | 3/2005 | King et al. | |
| 2005/0270288 A1 | 12/2005 | Arcas | |

(Continued)

FOREIGN PATENT DOCUMENTS

| | | |
|---|---|---|
| JP | 2002157515 | 5/2002 |
| JP | 2009508274 | 2/2009 |
| WO | WO2007033354 | 3/2007 |

OTHER PUBLICATIONS

Christensen, "Utilising a Geographic Space Metaphor in a Software Development Enviroment", retrieved on Apr. 2, 2009 at https://eprints.kfupm.edu.sa/75060/1/75060.pdf, Centre for Experimental System Development, Department of Computer Science, University of Aarhus, Denmark, pp. 39-56.

(Continued)

*Primary Examiner* — Matt Kim
*Assistant Examiner* — Hua Lu
(74) *Attorney, Agent, or Firm* — Lee & Hayes, PLLC

(57) ABSTRACT

The present disclosure describes an apparatus and a method for contemporaneously viewing code structure in a diagram as well as source code facilitated by a semantic zoom and pan feature and enabled via use of advanced rendering engines. The apparatus and method support in-place editing where edits are represented on the diagram in real-time. One example system includes a diagramming surface, an advanced rendering engine, viewers with controls and data retrieval modules, a data store with data loaded from source code well as external sources, and workers possibly implemented as background threads to monitor changes. One example method enables layers where a subset of data is viewed and a corresponding control is used to manipulate the data. An advanced rendering engine enables a wide range of user interface techniques, including but not limited to semantic zoom and pan and in-place editing.

20 Claims, 3 Drawing Sheets

(56) References Cited

U.S. PATENT DOCUMENTS

| | | | |
|---|---|---|---|
| 2006/0005146 | A1 | 1/2006 | Arcas |
| 2006/0038823 | A1 | 2/2006 | Arcas |
| 2006/0176305 | A1 | 8/2006 | Arcas et al. |
| 2006/0235941 | A1 | 10/2006 | Arcas et al. |
| 2007/0036462 | A1 | 2/2007 | Crandall et al. |
| 2007/0136683 | A1* | 6/2007 | Heidari et al. ............ 715/792 |
| 2007/0147892 | A1 | 6/2007 | Tomatsu et al. |
| 2007/0256054 | A1* | 11/2007 | Byrne et al. ............ 717/113 |
| 2008/0104570 | A1* | 5/2008 | Chedgey et al. ............ 717/105 |
| 2008/0127065 | A1* | 5/2008 | Bryant et al. ............ 717/109 |
| 2009/0013306 | A1* | 1/2009 | Elaasar et al. ............ 717/105 |
| 2009/0157503 | A1 | 6/2009 | Farouki et al. |

OTHER PUBLICATIONS

Heer, et al., "Prefuse: A Toolkit for Interactive Information Visualization", retrieved on Apr. 2, 2009 at http://www.cs.nott.ac.uk/~nxk/TEACHING/G53BIO/prefuse.pdf, CHI 2005, Papers: Interactive Information Visualization, Apr. 2-7, Portland, OR., pp. 421-430.

Heer, et al., "Software Design Patterns for Information Visualization", retrieved on Apr. 2, 2009 at http://vis.berkeley.edu/papers/infovis_design_patterns/2006-DesignPatterns-InfoVis.pdf, IEEE Transactions on Visualization and Computer Graphics, vol. 12, No. 5, Sep./Oct. 2006, 8 pages.

Maletic, et al., "A Task Oriented View of Software Visualization", retrieved on Apr. 2, 2009 at http://www.sdml.info/collard/papers/vissoft02.pdf, Department of Computer Science, Kent State University, 9 pages.

Perlin, et al., "An Alternative Approach to the Computer Interface", retrieved on Apr. 2, 2009 at http://wiki.lri.fr/fondihm/_files/pad-siggraph93-perlin.pdf, Courant Institute of Mathematical Sciences, NY, NY, 8 pages.

BillionDollarHomePageOnline.com, retrieved on Oct. 12, 2010 at <<http://web.archive.org/web/20060503001504/http://www.billondollarhomepageonline.com>>, 3 pages.

The Chinese Office Action mailed Sep. 7, 2011 for Chinese patent application No. 200880122112.7, a counterpart foreign application of U.S. Appl. No. 11/958,677, 10 pages.

The European Office Action mailed Jan. 24, 2012 for European patent application No. 08862610.6, a counterpart foreign application of U.S. Appl. No. 11/958,677, 6 pages.

The European Office Action mailed Jul. 20, 2012 for European patent application No. 08862610.6, a counterpart foreign application of U.S. Appl. No. 11/958,677, 6 pages.

The Extended European Search Report mailed Jun. 22, 2011 for European patent application No. 08862610.6, 6 pgs.

The Australian Office Action mailed Oct. 23, 2012 for Australian patent application No. 2008338352, a counterpart foreign application of U.S. Appl. No. 11/958,677, 2 pages.

The European Office Action mailed Nov. 16, 2012 for European patent application No. 08862610.6, a counterpart foreign application of U.S. Appl. No. 11/958,677, 11 pages.

Habu, "Technical Descriptions on New Format for Image Files Best Suited to Computer Processing, Specifications and Features of FlashPix Aiming for Industrial Standard", Nikkei Computer, Japan, Nikkei Business Publications, Inc., Mar. 16, 1998, Issue No. 439, pp. 187-192.

The Japanese Office Action mailed Nov. 15, 2012 for Japanese patent application No. 2010-539760, a counterpart foreign application of U.S. Appl. No. 11/958,677, 3 pages.

* cited by examiner

SOURCE CODE SEMANTIC ZOOM AND SPATIAL LAYOUT

BACKGROUND

Developers generally generate software by creating source code. Typically source code is text comprising programming language instructions for a computer. This source code may be interpreted or compiled and linked into a binary for execution. In some cases, such as SmallTalk, the source code may exist entirely in an integrated development environment (IDE) presented independently of files. Nonetheless, the IDE presents the source code as text.

As software has evolved, different programming language philosophies, such as structural programming, generic programming, and object oriented programming, allow for the development of more complex pieces of software from simpler pieces of software. For instance, functions may be created from other functions. Further still, objects may be composed from other objects. Concrete objects or methods may be created by populating templates. Objects may be created from methods and attributes.

In this way, contemporary programming languages provide for the creation of software entities, where the entities have relationships with each other. The addition of this structure has provided for the development of software of increasing complexity in a disciplined manner.

In fact, the structure of the software entities and their interrelationships are so critical to the understanding of the software that software architects presently use diagrams to illustrate the software structure without the code. Unified Modeling Language (UML) provides diagrams that among other things show relationships and invocations between objects. This language, however, does not provide relationships and invocations between pieces of the source code. For relational databases, entity relationship diagrams show the structure of relational tables without showing the underlying Structure Query Language (SQL). Indeed, the intent of UML and Entity Relationship Diagrams (ERDs) have been to abstract out the source code details.

As diagrams of software have gained acceptance, tools to develop diagrams have proliferated. UML is often edited with RATIONAL ROSE™ or other editors. Several ERD editors exist in the marketplace.

These diagram editors have been primarily focused in aiding developers in developing the diagrams themselves and then afterwards generating the source code. This is a result of the software development methodologies to focus on software structure prior to the actual writing of source code. Often the diagrams editors have the user edit diagrams and then use a source code generator component to generate source code to be edited afterwards.

SUMMARY

The present disclosure describes techniques (e.g., apparatuses, systems, methods and the like) for contemporaneously viewing code structure in a diagram as well as source code facilitated by a semantic zoom and pan feature. These techniques support in-place editing where edits are represented on the diagram in real-time. Because these techniques make use of advanced rendering engines, they provide user interface techniques not previously available.

In some instances, the system comprises a diagramming surface, a rendering engine, and viewers with controls and data retrieval modules to access the data to be rendered. The rendering engine is enabled with advanced 3D, animation and shading capabilities. The system may directly access the source code. Alternatively, a centralized data store may contain source code and also data external to the source code. Loaders load the source code and external data into the centralized data store. Workers, possibly implemented as background threads, monitor the loaders and update the rendered diagram in real-time. Workers may also provide background services not related to monitoring data changes as well.

In some instances, a method described herein includes opening a representation comprising source code data, external data, and state information (e.g., session state). A layer, or a subset of data with corresponding controls may be specified, the data retrieved, and rendered on the drawing surface. A set of one or more active controls may be used to manipulate data whereupon the data is updated, a worker is notified of the change, and invocations are made to re-retrieve the data and re-render the data. Alternatively, a user may change the existing layer or may overlay another layer. If the user opts to exit, the representation is closed and session state persisted.

The above describes one example method to provide a wide range of controls in addition to semantic zoom and pan and in-place editing including but not limited to, providing custom groupings and groupings external to the source code, annotations, local zoom/previewing, search, syntax checking, statement completion, reference preservation, and multiple workspaces, as described in detail below.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), and/or computer-readable instructions, as permitted by the context above and throughout the document.

BRIEF DESCRIPTION OF THE DRAWINGS

Non-limiting and non-exhaustive examples are described with reference to the following figures. In the figures, the left-most digit(s) of a reference number identifies the FIG. in which the reference number first appears. The use of the same reference numbers in different figures indicates similar or identical items or features.

DETAILED DESCRIPTION

Figure 1:
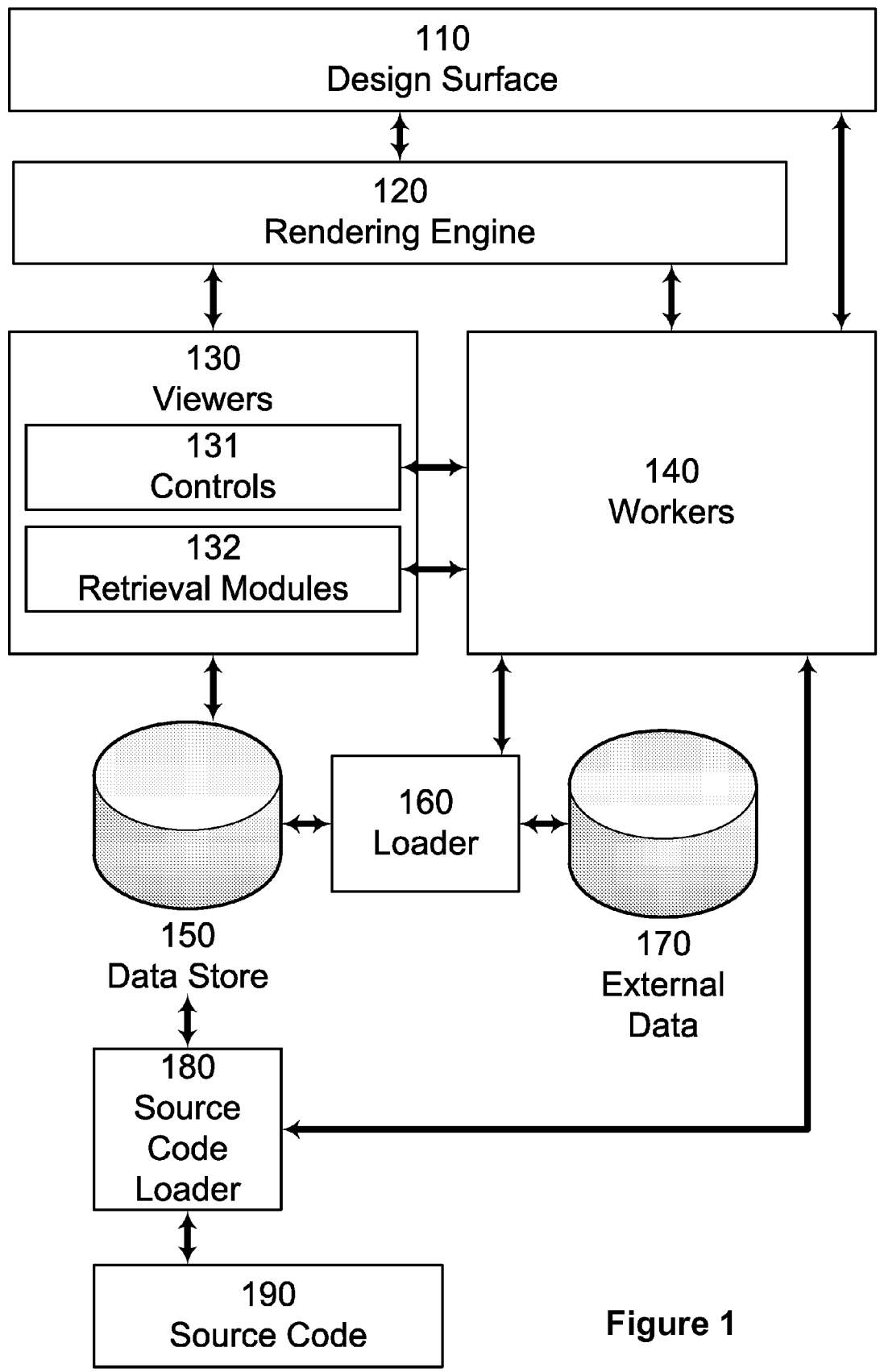
FIG. 1 illustrates a block diagram of an illustrative system that may employ the semantic zoom and spatial layout techniques described herein.

Source Code Understanding via Semantic Zoom and Spatial Layout i. Overview

The present disclosure describes techniques (e.g., systems, apparatuses, methods, etc.) for contemporaneously viewing code structure in a diagram as well as source code. At any point in time, a user may view a body of source code in a single view geometrically organized according to the structure of the source code. However, by applying advanced graphics capabilities available via application programming interfaces (APIs) such as DIRECTX™ and OpenGL to create a user interface (UI), a user may zoom out with the source code shrinking proportionally, and focus on the code structure. Alternatively, the user may zoom in to a particular portion of the source code structure and then focus on the source code itself. A user may navigate through the source code by panning in any direction. In this way, the user navigates through a unified representation of both code structure and code content without loss of context.

If the user zooms to the appropriate level, the techniques provide for in-place editing of the source code. As source code gets edited the structure updates in real time, near real-time, or at some other predefined intervals.

ii. Levels of Abstraction

Source code has many possible layers of abstraction. One of the lower levels is where a user is focused on a particular function and editing the source code itself. One of the higher levels is where the entire system is viewed as a set of entities and relationships. For example, the highest view of an object oriented system emphasizes objects comprising the system, and inheritance and containment relationships, with the source code so reduced in size as to abstract it away. The techniques described herein allow a user to switch between these two extremes via a zooming mechanism.

At a more midlevel view, one may see some subset of objects, not quite see the source code, and have enough detail to see object attributes and methods. Although the zooming mechanism increases the detail seen, the size of the screen limits the objects that may be viewed. Accordingly, panning or scrolling enables a user to see objects that otherwise would be off-screen at the same level of detail. A local zooming mechanism may be used to temporarily zoom in on particular objects without changing from the current midlevel view.

The techniques in this disclosure may additionally provide features including but not limited to allowing the user to view subsets of the source code, view different renderings of the source code, overlay different indicators of groupings and relationships of the representation of the source code and provide controls specific to a rendering or overlay. Alternatively different embodiments of the techniques in this disclosure may be directed to displaying compiled code artifacts, such as executables, dynamic link libraries, and other binaries, rather than source code.

In addition, relationships need not be limited to static relationships. For example, invocations are relationships that may be represented in the techniques in this disclosure. Similarly, relationships need not be object oriented. For example an entity relationship diagram of a relational database showing cardinality relationships is supported. Additional relationships not even contained on the source code, that is external to the source code may also be shown. These external relationships may be shown as a grouping of entities. For example, objects may correspond to C++ source code files which in turn are grouped into directories. Directory information is not generally indicated in source code, but may be of interest to a user. Thus, a directory is an example of an external grouping. In fact, a relationship may be an arbitrary user defined external grouping where the nature of the relationship is known only to the user.

External data may not even relate to groupings. For example, test suite coverage of the source code and failed test data may be shown as well. By way of another example, version information can be shown to indicate how often a piece of code is redesigned or rewritten.

Table A below illustrates some common relationship types, illustrative renderings, and example relationships.

TABLE A

Common Relationships Types

| Relationship Type | Illustrative Rendering | Example Relationship |
|---|---|---|
| Relations | Arrows | Inheritance<br>Invocation<br>Generics |
| Sequences | Chain of Arrows | Runtime Trace<br>Coding Sequence |
| Containment | Boxes/Pillboxes | Folder Hierarchy<br>Binary Containment<br>Project<br>User Defined |
| Coverage | Highlighting | Code Coverage | iii. Layers

Industrial strength code has a large number of entities in industrial strength code and an even larger number of relationships within the source code and external data. Accordingly, industrial strength code gives rise to a large number of attributes of interest about the code; that is a large number of related data points about the entities in the code. A view is a subset of entities and relationships between entities in the source code and possibly from external data about the source code. For example source code may include parent objects P1, P2 and child objects C1, C2, C3, C4. A view may be defined to show only parent objects P1 and P2.

A layer is a view that includes controls to manipulate the view. Layers provide a way to indicate an attribute of interest, or a set of attributes of interest, by limiting rendering to the relevant subset of the source code and external data. In doing so, attributes not of interest may be abstracted away, de-emphasized, or simply not shown. Accordingly, layers provide a way of viewing and manipulating one or more attributes at a time without having to view all the attributes all at once.

iv. Overlays

Just as a layer can be applied to the entire corpus of data comprising the source code data and any external data relating to the source code, another layer may be overlaid on top of a layer. Specifically an overlay is an application of a layer upon another layer. Accordingly, overlays theoretically can be applied an arbitrary number of times. An example is a layer that provides a view of some subset of objects in the system, perhaps all the objects in a particular module. If a user wishes to view those objects in the context of test code coverage, an overlay may render those objects with a control structure diagram and may provide color coding to indicate code coverage. Thus the test coverage data and extra controls render additional information i.e. a secondary layer, and provide additional controls, here the control structure diagram.

Illustrative Hardware Platform for Semantic Zoom and Spatial Layout

One example hardware platform of the techniques in this disclosure is a personal computer (PC) based on a standard PC architecture. Other examples include, but are not limited to, server based hosts ranging from grid networks, cloud hosts, and legacy mainframes.

Specifically detailing a standard PC architecture, there is a processing unit comprised of one or more central processing units (CPU) where each CPU may have one or more cores. There is an on board read only memory (ROM), usually a basic input/output system (BIOS) which manages boot up. For working memory, there typically is random access memory (RAM). For storage, including virtual swap space, there are typically one or more hard drives. There is an input/output interface, supporting both serial and parallel operations. The input/output interface may contain support for a mouse and keyboard, or the PC may have a separate interface. All these parts are generally connected on a bus to multiplex data and instruction connectivity. Usually there is a fast bus for CPU communications to RAM and a slow bus for input/output operations. In this situation, connectivity between the two buses is typically handled by a northbridge.

The input/output interface typically includes connectivity to a number of peripherals. Expansion cards or on-motherboard functionality may be directly connected to the bus. Commonly there is a video graphics card which in turn provides connectivity to a video monitor. If the PC is to be networked, there may be a modem or network interface card (NIC). NICs may support a wide range of protocols. The PC may even have a cellular modem. Audio functions such as microphone and speaker support may be supported by an audio card. Interface for optical storage such as CD-ROM, DVD-ROM, and BLU-RAY™ disks may be handled through the input/output interface. Other portable storage such as memory sticks/thumb drives and legacy floppy drives also are handled through the input/output interface.

Illustrative System for Semantic Zoom and Spatial Layout

FIG. 1 is a block diagram illustrating an example system embodiment of semantic zoom and spatial layout. Specifically, FIG. 1 illustrates a graphical user interface of a computer application that comprises a diagramming surface 110, a rendering engine 120 and one or more viewers 130. The diagramming surface 110 provides the actual drawing surface to graphically render diagrams as instructed by the rendering engine, and to provide user controls including controls 131 exposed via the viewers 130. The diagrams may represent entities and relationships between entities in source code 190 and other data external to the source code 170.

The data generally is extracted via retrieval modules 132 in the viewers 130. The retrieval modules 132 may directly access the source code 170, via a file reader, parser, and transform mechanism. For example, a custom OLE-DB® provider could be used. Alternatively, and more typically an intermediate data store 150 may be utilized to facilitate a more centralized location for the data to be rendered. Accordingly source code 190 is loaded into the data store 150 via a source code loader 180 and external data is loaded into the data store 150 via a loader 160. The retrieval modules 132 in a viewer 130 can then retrieve the consolidated data directly from data store 150. The loaders are described in more detail in FIG. 2. Finally, to assist in asynchronous updates of the data, workers 140, possibly implemented as background threads, monitor actions in loader 160 and source code loader 180, as well as other actions, and update the rendering of the entities and relationships between the entities by invoking the diagramming surface 110, rendering engine 120 or viewer controls 131 and retrieval modules 132 directly.

The diagramming surface 110 is a component combining 3-dimensional (3D) drawing capabilities and effects with control capabilities. Drawing capabilities include but are not limited to pan and zoom. Control capabilities include but are not limited to receiving user input, including but not limited to mouse click, mouse drag, and mouse drop operations, as well as keyboard input. Accordingly, the diagramming surface 110 can render diagrams on its surface, receive user input and change and update the diagrams accordingly. The diagramming surface may store session state data locally, including but not limited to the location of shapes represented, font information, color information, preference information, zoom level, and pan information.

The drawing capabilities of diagramming surface 110 derive from a rendering engine 120. Rendering engine 120 may draw a number of graphical primitives including pixel points, and simple (and/or complex) geometric shapes, as well as provide drawing effects including coloring and shading on the diagramming surface 110. The rendering engine 120 further can build complex composite graphics built from these graphical primitives. Additionally the rendering engine 120 can animate the composite graphics and graphical primitives. In sum, a rendering engine 120 provides the diagramming surface the capabilities to draw the graphical primitives, composite graphics, and animation.

Any rendering engine, including custom engines built upon DIRECTX™ or OpenGL may suffice provided they support panning and zooming. Support for determining optimal layout of graphics may be supported by a graph layout engine such as the Microsoft® Auto Graph Layout (MSAGL) graph layout engine from MICROSOFT RESEARCH®. Sound effects may optionally be provided via an audio component. In FIG. 1, the rendering engine 120 is shown as separate from the diagramming surface 110, but optionally the rendering engine 120 may be internally integrated in to the diagramming surface itself. In addition, each of the components may be integrated in any illustrated or non-illustrated combination.

The diagramming surface 110 also has a control capability provided at least in part by viewers 130. The viewers comprise controls 131 and retrieval modules 132. Recall above the layer concept described above to allow viewing a subset of source code and external data along with some control over the view. In some instances, viewers 130 provide this capability. User input into these controls may modify the session state information of the diagramming surface.

Views are of subsets of data relating to entities and relationships between entities as retrieved by the retrieval modules 132. Viewers couple views with controls 131 to manipulate the data in real time. Accordingly, as a control 131 changes data, those changes are propagated both to the underlying source code and/or related data, as well as to the diagram possibly in real time. Thus, semantic zoom, layers, overlays, and search, to name a few examples may be implemented with viewers. To recall an example above, source code 190 may include parent objects P1, P2 and child objects C1, C2, C3, and C4. A view may be defined to show only parent objects P1 and P2. On that view, a viewer 130 may include a control 131 defined to shade and thereby differentiate the parent objects P1 and P2 from the other objects, and further receive mouse drag and drop user input to move the parent objects together as a block. The viewer 130 may include a retrieval module 132 to specifically query the data store 150 for parent object information. Additionally, if the control 131 provided the capability to edit the underlying source code 190, for example to add a new parent object, the retrieval module could also optionally update the central data store as an alternative to worker notifications described below.

Source code 190 generally includes a set of files containing programming language data. While this disclosure focuses on the notion of source code 190 being work artifacts in the application software development context, source code 190 may be any set of artifacts containing entities and relationships between entities may be used, and in fact may not be specific to software at all. For example, the underlying code for the schema of a relational database, the underlying resource file for a graphical user interface builder, may be treated as source code 190. Non-software examples may include and are not limited to network configuration files, architecture drawings, project management schedules and resource sheets.

The source code 190 may be in different files written in different languages. For example, some source code may be in C++, others in VISUAL BASIC™, yet others in C# or any other programming language. The source code may be stored in version control software such as SCCS/RCS or VISUAL SOURCESAFE™, and accordingly views may be defined on versions of source code. As mentioned above, source code need not be in files as in SmallTalk where the source code is integrated with the coding environment.

Depending on the programming language, the source code 190 will likely contain entities and relationships between the entities. For example in an object oriented language, objects are defined, standalone functions are defined. Objects may relate to each other via inheritance and containment. Alternatively, relationships may include invocation. In another example, in general languages, relationships, may include class or function templates.

Relationships between entities and relationships between the entities in the source code 190 may also exist in data external to the source code 170. Specifically, where external data has been placed in a store 170 in a form that may be integrated with the data about the entities and relationships between the entities in the source code 190, that data may be used in a viewer to render those relationships on the diagramming surface 110. An example is test code coverage data. Test code coverage data is data on how often attributes and methods of objects in source code, as well as other entities in source code have been invoked by test suites on the compiled software. A viewer may show all the entities and relationships between the entities in source code 190 as well as the test code coverage data 170. The viewer may shade the entities according to the degree of coverage and may provide controls 131 to filter and highlight entities where tests failed indicating the presence of bugs. Those controls 131 may further allow a user to quickly skip between the test failures as shown by the viewer 130 on the diagramming surface 110.

To provide an integrated view of source code 190 and external data 170 (e.g., test code coverage data), storing both into a data store 150 may be preferable. The data store 150 may be a single relational database, such as SQL SERVER™, or any other type of relational database. Alternatively, the data store 150 may be a series of separate data storage points that are abstracted together as a single data store. One example would be to have a separate relational database storing the external data such as test code coverage data and another store storing source code in an RCS source control database. However, in the described and non-limiting example, the data may be integrated into a single data store.

A source code loader 180 loads the data into data store 150 and a loader 160 loads external data into the data store 150. These loaders provide extract, transform, and load operations.

Figure 2:
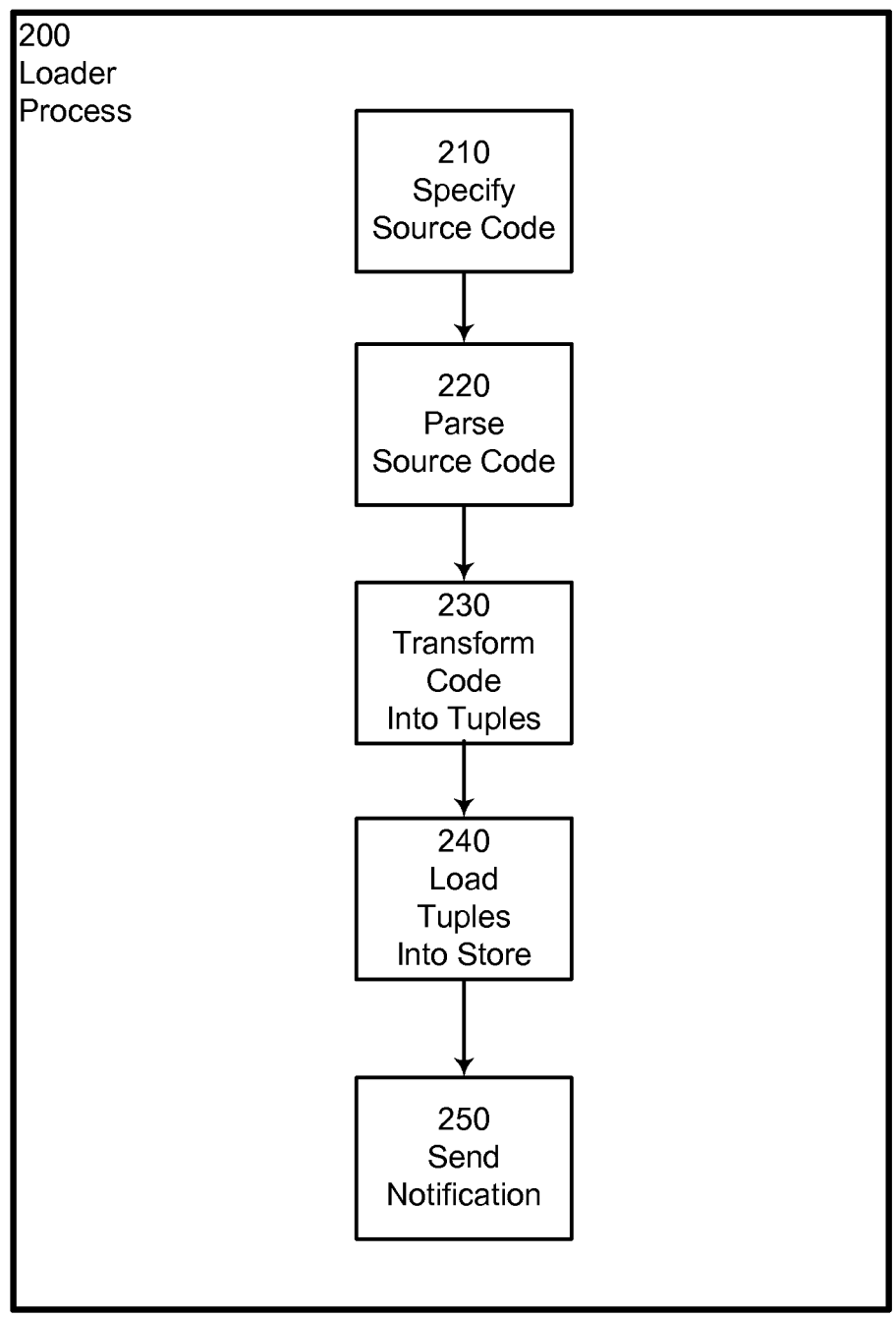
FIG. 2 illustrates a flow chart of an illustrative extract, transform, and load operation for a source code loader.

FIG. 2 illustrates an illustrative loader process 200. Process 200, as well as any other processes described herein, is illustrated as collections of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

The source code loader 180 may include a parser for the source code, a component to create tuple records, and a loader to store the tuple records into a relational database embodiment of the data store 150. At 210, a user specifies the set of source code files to be considered for loading. While a static set of source code files could be specified, since new source files may be created, and existing source code files deleted, a development project where source code files are associated may be used for specification. Alternatively a source control project might be used. In general, as stated above, any set of artifacts, including artifacts not involved in software development, that contain entities and relationships between entities may be used.

At 220, a parser performs a static scan on the source code. While the entire corpus of source code may be scanned, for efficiency only changed source might be scanned. At 230, a transformer translates the source code information into tuples to be stored in a relational database. For example a records for objects, records for object attributes, records for methods, and cross-references for attribute to object and method to object may be created.

At 240, the tuples or records are loaded into the relational database likely with a SQL insert operation. Finally at 250, a notification, perhaps via .NET® notification, may be sent to subscribing workers. The loader 160 provides similar services for external data.

Turning back to FIG. 1, both source code loader 180 and external data loader 160 may also provide respective notifications indicating that data has been loaded into the data store, and therefore that the data store has changed. Workers 140 may subscribe to these notifications, determine the nature of the data changes, and update the diagram displayed on the diagramming surface 110. To do so, workers 140 may provide the corresponding invocations of the rendering engine 120 and the viewers 130. In this way, changes may propagate in real time. Alternatively, workers 140 may poll the data store directly periodically, randomly or in some other predefined manner.

While FIG. 1 illustrates the workers directly accessing the design surface 110 and the rendering engine 120, embodiments may configure the workers to invoke only the viewers. In this configuration, tasks to update the rendering are solely contained within the viewer aiding maintainability and coherence of the system.

Workers 140 provide a generalized means for providing background services. While workers 140 may be implemented as background threads, in some cases they may be implemented as foreground threads, for example for fast rendering. Workers 140 are not limited to monitoring data store 150 changes; and may perform data compression and data indexing services during operation, possibly among other tasks.

Illustrative Method for Semantic Zoom and Spatial Layout

Figure 3:
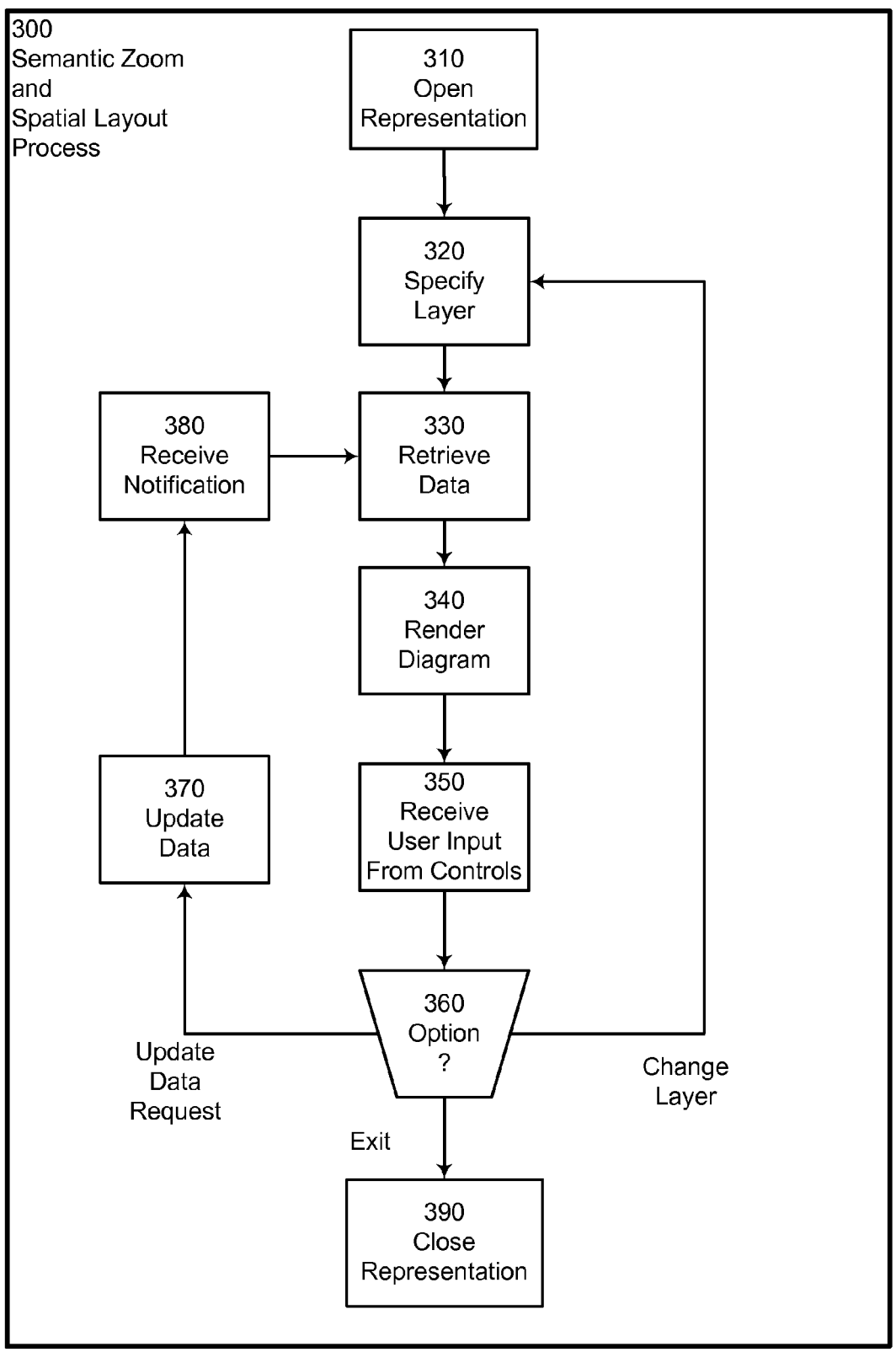
FIG. 3 illustrates a flow chart of an illustrative method for deploying the semantic zoom and spatial layout techniques described herein.

FIG. 3 illustrates an illustrative process 300 for semantic zoom and spatial layout. Specifically, at 310, a user opens a representation comprising some specified set of source code and optionally external data that the user wishes to view on the diagramming surface, plus session state information as to how the data is actively viewed. At 320, the user may wish to specify a layer, which in turn triggers a viewer. At 330, the viewer retrieves the subset of entities and relationships between the entities. At 340 renders the data, and enables access to controls relating to the layer. At 350, the controls receive user input which is processed at 360. If the user input control modifies the data, it follows the update data request prong, and updates the underlying data. A worker may be notified of the update at 380, and will re-retrieve the data at 330 and re-render the data at 340 as necessary, before awaiting user input at 350. If the user input requests either a different layer, or overlaying an additional layer, it follows the change layer prong as follows. At 320, the new layer is specified. At 330, the data re-retrieved. At 340, the retrieved data is re-rendered at. As previously described, at 350 awaits user input. Finally, if the user opts to exit, the rendering is closed at 390 and the process exits.

Discussing the method in greater detail, at 310, a representation refers to some subset of source code and optionally external data to be rendered and manipulated on the diagramming surface, plus state data. The method could support multiple representations of the same source code and external data by since the state data need not be the same. For example, one user may view a project comprising objects A, B, and C, and drag and drop the objects into a triangle. Another user may drag and drop A, B, and C into a line, and then modify the view such that only A and C were viewed. By storing state along with the source code data and external data, multiple users may be supported. The multiple users may access their respective representations in different sessions on the same machine. In the alternative, the users may access their respective representations remotely.

As described above, source code may be specified via selecting a software project, to handle the cases of adding, deleting, and merging source code files.

The representation in 310 need not be only of source code. As described above, the method invention could allow viewing binaries such as executables and dynamic link libraries. In embodiments where no source code is rendered and only external data is rendered, it is possible to apply the techniques to non-software development scenarios, including but not limited to project management, document management, workflow, or any other project with work artifacts containing entities and relationships between entities. A non-software example is project management workflow where tasks are entities and relationships between tasks include order and dependency; alternatively, resources can be entities and relationships between resources include dependencies between those resources.

A layer may be selected at 320 preferentially via a menu option. Layers may be hard coded into a software implementation of the techniques described herein or alternatively layers may be defined as dynamic link libraries and added via a plug in extension interface.

A layer may be selected at 320 via a context menu (or any other manner), by mouse hovering, or via selection of text or entities or relationships via a mouse click or other selection type. One scenario where this occurs is for overlays. For example, clicking on or otherwise selecting an object may trigger an in-place editor.

In some embodiments, data is retrieved at 330 from a centralized data store. In other embodiments, it may be extracted directly from the source code itself.

A diagram may be rendered At 340 via a rendering engine drawing on a diagramming surface. Depending on the layout, or the controls, the rendering may emphasize particular entities or relationships between entities.

Once the data and the control are rendered, the method waits for user input at 350. The choice is evaluated at 360. If the user input results in changing data, the underlying data, usually source code, is updated at 370. Thereafter, at 380 a worker received a notification of the data change. In response to the notification, the worker invokes the diagramming surface, viewer, rendering engine, to provide real-time or timely updating. Note that some user input simply changes state on the diagramming surface and does not change the underlying data. In these instances, process 300 may skip steps 370 and 380. For example if a user drags and drops an entity to a different location, the source code is not necessarily changed; rather only the local state on the diagramming surface has changed. Specifically, while the underlying data is not edited, the location of the entities and the zoom level are persisted in local state, and may be manipulated by user input.

In some cases, a layer may be changed or an overlay triggered. In this case, the layer is re-specified at 320, and the data re-retrieved at 330 and re-rendered in 340. User input then is awaited at 350.

Finally, where the user opts to exit, at 390 a representation is closed. This generally will include not only shutting down data access to the data stores, but also persisting any session state or representation state.

Illustrative Control Operations

The foregoing discussion provides the examples of mechanisms to implement the semantic zooming and panning techniques, as well as layering concepts. Because some embodiments use an advanced 3D rendering engine, a wide choice of display and control options are available. In addition to standard color and patterning features, transparencies, complex shading, animation, and distortion effects are also available. For example, where objects belong to multiple groups, a group may be rendered as a transparency, as to allow a user to see the object despite belonging to overlapping groups. Some specific illustrative options are provided in this section.

Semantic zoom may receive user input in the form of a level of detail slider control comprising a band and a thumb. For example, for a slider is disposed horizontally, if the thumb is moved towards the left, the view of the software moves in to a higher level of detail down to the actual source code. If the thumb is moved towards the right, the view of the software moves out to a more generalized level of detail emphasizing the structure.

Semantic zoom need not require a GUI element such as a level of detail slider. Alternatively hot keys, a wheel on a scroll mouse, or any other form of input may provide the user input information on zooming.

As a user zooms in and out of a view, it may be desirable to preserve reference information. Specifically, references may be represented as arrows with captions. As a user zooms out, abstracting away source code, the techniques described herein may preserve the readability of relationship captions. Alternatively, as a user zooms in, instead of having the captions scroll off the screen, the captions would remain on-screen.

Since most of the time, the user will not be viewing the entire corpus of software; the user will have to pan to see entities and relationships off-screen. Generally this may be accomplished via GUI scroll bars or mouse rolling.

The techniques described herein are intended to be highly interactive. Previewing, that is temporarily displaying, layers, overlays, other information, or other renderings, usually triggered by simple user inputs such as hovering or item selection, temporarily allow a user to quickly obtain information without persisting a change to the representation.

An example of previewing is local zoom. Zooming may be local. For example, a user may only want to zoom in on a single entity but not the rest of the view. Specifically, zooming only on a single entity may be triggered either by hovering over an object with a mouse or by selecting the object. The effect is to maintain the original level of detail, but to expand out the selected object into local zoom. The local zoom may persist and allow the user to do in place editing without the entire view being at the source code level.

Selection need not be at the entity level. If the zoom is set to the source code level itself, a selecting or hovering over text can trigger and overlay. For example, selecting a method in an object could overlay arrows to some or all the functions invoking the object method. In another example, selecting a method could overlay development data, such as the most recent source code change of the method and the name of the developer.

Data shown is not limited to data in the source code. External data and external groupings may also be shown. For example, a user may arbitrarily define a several groups of objects of interest (i.e., groups external to the source code). By way of another example, test coverage data (i.e. data external to the source code) may be overlaid. Yet another example is annotation data where multiple users may comment on the source code, i.e. data specific to the session state of the representation or of multiple representations. Selecting an object may overlay graphical comment boxes containing comments for a specified time window.

In the spirit of merging diagramming and source code information together, the techniques described herein provide an in-place editor. If the user zooms to the source code level of detail, the user may activate an in-place editor and edit the local code normally. The in-place editor supports modern code editing features including but not limited to statement completion and syntax checking such as Microsoft Intellisense®. As the code gets modified, the techniques described herein updates the diagram in real-time, usually via a monitoring worker.

With a very large corpus of source code, a search feature aids in navigation. The techniques described herein support a user entering search criteria, and locating matching entities and relationship between entities. The search criteria may be a simple text search, such as a request to identify all entities called "Animal." Or the search criteria may be based on source code data, external data, or a combination, for example all objects edited in the last 24 hours or all objects belonging to the following files. Navigation may be via the generation of a list or via skipping among the objects best matching the criteria. Alternatively the techniques described herein could render the matching objects to be highlighted, or the non-matching objects made to disappear. The objects could also be automatically moved or grouped as desired.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system having a processor comprising:
   at least one artifact comprising data relating to entities and relationships between the entities;
   a diagramming surface to represent the entities and the relationships between the entities;
   the processor to render views of data relating to the entities and the relationships between the entities on the diagramming surface,
   a real-time viewer operably coupled to the diagramming surface, the real time viewer comprising:
   (a) at least one retrieval module to retrieve data from the at least one artifact comprising the data and the relationships to be rendered by the rendering engine, and
   (b) a plurality of controls to proportionally manipulate views of the data and the relationships to be rendered by the rendering engine, at least one of the controls comprising an in-place editor and at least one of the controls comprising a panning and zooming control, in which the proportionally manipulating comprises proportionally shrinking the data with the relationships, wherein the zooming control proportionally manipulates the views among a plurality of layers of abstraction of source code including an intermediate level view with details of object attributes and the source code reduced in size such that the source code is not shown.

2. The system of claim 1 further comprising an intervening data store wherein at least some of the data relating to the entities and relationships is stored in the intervening data store and the at least one retrieval module accesses the at least some of the data relating to entities and relationships from the intervening data store.

3. The system of claim 2 further comprising a loader operably coupled to the intervening data store, the loader to load at least some of the data relating to the entities and the relationships into the intervening data store, wherein the at least some of the data relating to the entities and the relationships is data external to the artifact.

4. The system of claim 2 further comprising a source code loader operably coupled to the intervening data store, the source code loader to load at least some of the data relating to the entities and the relationships into the intervening data store wherein the at least some of the data relating to the entities and the relationships is data internal to the artifact.

5. The system of claim 1 further comprising a worker component, the worker component operably coupled to the diagramming surface, rendering engine, or viewer to receive a software notification and, upon receiving the software notification, updating the representation of the entities and relationships between the entities represented by the diagramming surface.

6. A method to manipulate a representation of entities and relationships between entities and session state information of the representation in a computer user interface, the method comprising:
   retrieving data relating to entities and relationships between entities from at least one artifact comprising data relating to entities and relationships between entities;
   storing user interface session state information of the representation comprising navigation and rendering information specific to a session;
   rendering the data relating to the entities and the relationships between entities on a diagramming surface comprising a representation of entities and relationships between entities;
   manipulating data relating to entities and relationships between entities and user interface session state information of the representation by:
   (a) panning across the representation of entities and relationships between entities, and
   (b) zooming in or out of the representation of entities and relationships between entities, in which the zooming proportionally manipulates the data among a plurality of layers of abstraction of source code including an intermediate level view with details of entity attributes and the source code reduced in size such that the source code is not shown, wherein the zooming out comprises proportionally shrinking a structure of the source code with the source code.

7. The method of claim 6 wherein a subset of the entities and the relationships between the entities are represented by a layer comprising a representation of a subset of the entities, a representation indicating relationships between entities in the subset of the entities, and a control to manipulate the representation of the subset of entities.

8. The method of claim 7 wherein the relationship between entities to be represented is an external grouping.

9. The method of claim 8 wherein the control to manipulate the representation of the subset of entities further comprises an annotation editor, and wherein the control triggers display of at least some annotations.

10. The method of claim 7, wherein a subset of the entities and relationships between the entities are manipulated by a second layer overlaid over the first layer.

11. The method of claim 10, wherein the second layer is overlaid upon a selecting of text in an entity in the first layer.

12. The method of claim 6 further comprising manipulating the representation of entities and relationships between entities,
the representation comprising user interface session state information of the representation, the user interface session state information comprising a zoom level,
by previewing, the previewing comprising zooming on a local subset of entities or relationships between entities while maintaining the previous zoom level for the entities or relationships between entities excluded from the local subset.

13. The method of claim 6 further comprising manipulating the representation of entities and relationships between entities and user interface session state information of the representation,
receiving search criteria,
identifying entities and relationships between entities associated with the search criteria, and
representing at least some of the entities and relationships between entities matching the search criteria.

14. The method of claim 6 wherein the manipulating data relating to entities and relationships between entities and user interface session state information of the representation further comprises editing the data underlying the representation of entities and relationships with an in-place editor, wherein the data is internal to the artifact.

15. The method of claim 6 wherein the rendering the entities and relationships between entities on a diagramming surface includes rendering a transparency over a subset of data entities and relationships between entities.

16. The method of claim 6 wherein the captions of references are preserved during panning and zooming.

17. The method of claim 6 wherein the method further comprises supporting multiple representations of entities and relationships between entities.

18. The method of claim 17 wherein at least one representation of entities and relationships between entities corresponds to a first user and at least one representation of entities and relationships between entities corresponds to a second user.

19. The method of claim 18 wherein the first user and the second user are remote from each other.

20. A computer readable memory comprising instructions operable for a computer to perform a method, the method comprising:
retrieving data relating to entities and relationships between entities from at least one artifact comprising data relating to entities and relationships between entities;
storing user interface session state information of the representation comprising navigation and rendering information specific to a session;
rendering the data relating to the entities and the relationships between entities on a diagramming surface comprising a representation of entities and relationships between entities;
manipulating data relating to entities and relationships between entities and user interface session state information of the representation by:
(a) panning across the representation of entities and relationships between entities, and
(b) zooming in or out of the representation of entities and relationships between entities, in which the zooming control proportionally manipulates the data among a plurality of layers of abstraction of source code including an intermediate level view with details of entity attributes and the source code reduced in size such that the source code is not shown, wherein the zooming out comprises proportionally shrinking the source code with a structure of the source code.

* * * * *